United States Patent [19]

Palm

[11] Patent Number: 5,213,459
[45] Date of Patent: May 25, 1993

[54] SELF-DRILLING CONNECTING UNIT

[75] Inventor: Erich Palm, Heerbrugg, Switzerland

[73] Assignee: SFS Stadler Holding AG, Heerbrugg, Switzerland

[21] Appl. No.: 761,996

[22] PCT Filed: Dec. 21, 1990

[86] PCT No.: PCT/EP90/02293
§ 371 Date: Sep. 25, 1991
§ 102(e) Date: Sep. 25, 1991

[87] PCT Pub. No.: WO91/11631
PCT Pub. Date: Aug. 8, 1991

[30] Foreign Application Priority Data

Feb. 5, 1990 [DE] Fed. Rep. of Germany ....... 4003374

[51] Int. Cl.⁵ .................. F16B 13/04; F16B 13/06
[52] U.S. Cl. .............................. 411/29; 411/55; 411/387
[58] Field of Search ............... 411/29, 30, 31, 386, 411/387, 55, 57

[56] References Cited

U.S. PATENT DOCUMENTS 1,449,625  3/1923  Phillips ........................... 411/29
3,935,786  2/1976  Murray et al. ................. 411/29

FOREIGN PATENT DOCUMENTS 49218    4/1982  European Pat. Off. ......... 411/387
2801962  7/1978  Fed. Rep. of Germany ... 411/387
85165    5/1965  France ............................. 411/29

Primary Examiner—Neill R. Wilson
Attorney, Agent, or Firm—Helfgott & Karas

[57] ABSTRACT

A self-drilling connecting unit includes a shaft and a platelet-like cutting tool attachable to the shaft in a form- and/or force-fitted manner. The platelet-like cutting tool has a platelet-like protrusion lying in the plane of the cutting tool in its end region facing the shaft. The end region of the shaft, which bears the cutting tool, has a central opening. The protrusion of the cutting tool is insertable into the opening of the shaft and is braced by a pressure seat in the opening against two diametrically opposed boundaries of the inner wall of the opening whereby a sufficient mount and an exactly axis-parallel alignment of the cutting tool against the shaft are provided.

17 Claims, 2 Drawing Sheets

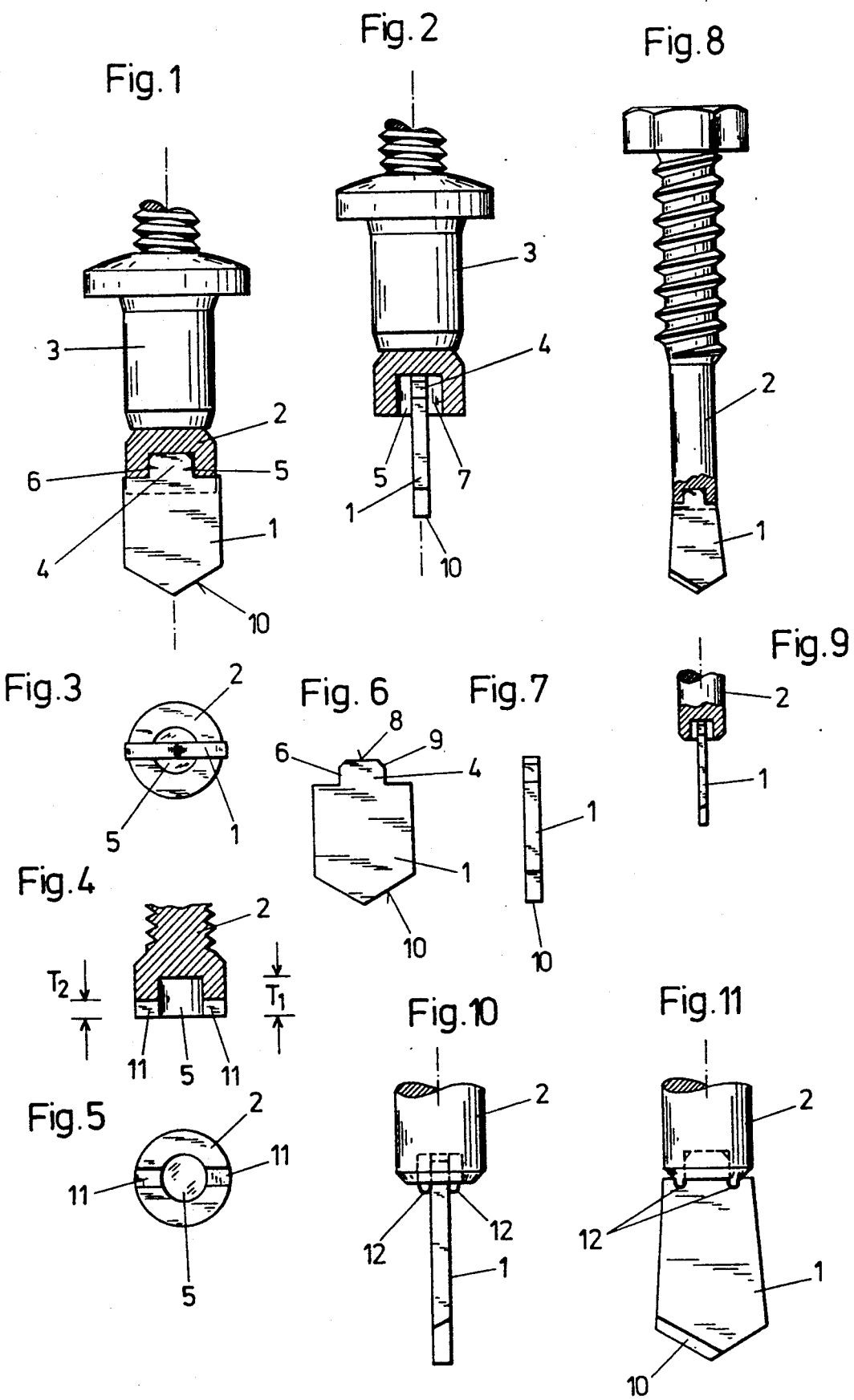

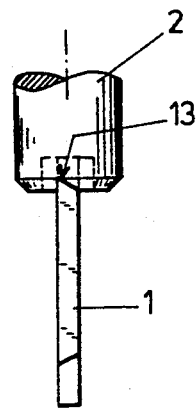
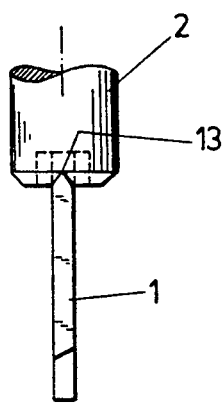
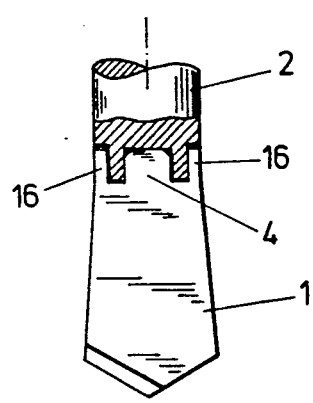
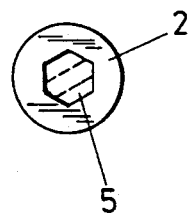
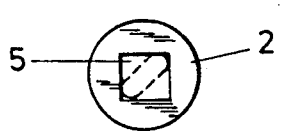
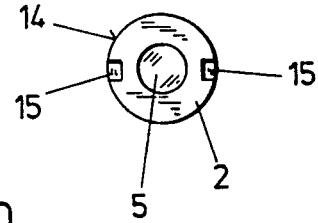
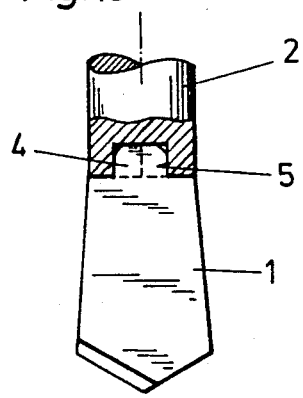
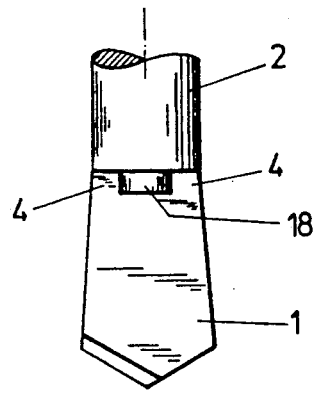
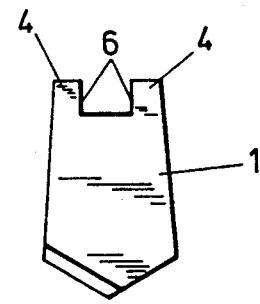
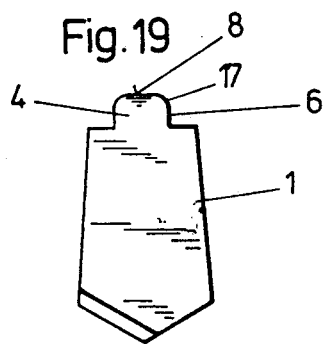
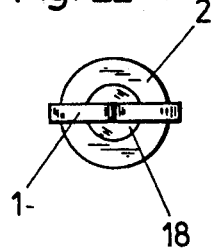

SELF-DRILLING CONNECTING UNIT

BACKGROUND OF THE INVENTION

The present invention pertains to self-drilling connecting unit with a plate-shaped cutting tool attaching to a shaft.

The use of plate-shaped cutting tools is known both for drills and also for self-drilling connecting units. The use of plate-shaped cutting tools is better than of circular cross section drills, because the drilling power is much better and because the drilling performance can be adapted to the particular job.

Patent AT-PS 356 462 discloses how to provide a central, longitudinal slit at the free end of the shaft of a screw, in this slit a cutting plate is installed. Now elevations and/or depressions are provided on the cutting plate for shape- and/or force-fit insertion into the longitudinal slit of the screw. Moreover, on the cutting plate some ribs are provided and they run parallel to the central axis on the region turned away from the cutting. These ribs are set in parallel rows and are located on both facing surfaces. These ribs are of cutter-like design and have a triangular cross section for this purpose. Merely the placement of these cutter-like ribs will ensure a fixed mount of the cutter plate in the longitudinal slit, which makes an additional gluing superfluous. Naturally for particularly severe uses, an additional gluing or other connection is possible, and the provided ribs then make possible a preliminary fixing in place and thus an easier handling. This known, self-drilling screw thus requires a complicated cutting plate, but this does not ensure that it will be properly centered and aligned with respect to the shaft during the mounting.

From DE-OS 25 49 147 it is known how to form a slit on the free end of a self-drilling screw with circular cross section and drill bit equipped additionally with grooves and cuts. A platelet-like cutting tool is inserted into the slit and is joined in an additional work step with the drilling unit by welding, soldering or gluing. Here too, it is not possible to center the platelet-like cutter during the mounting, and in addition, in any case one work step is required to establish a secure link between cutting tool and drilling unit.

From DE-OS 25 55 647 a drilling screw is known whose shaft has a drilled hole on the end opposite the screw head. The drill point of the screw is a separately produced joining piece that has a mounting shaft that extends into the drill hole of the shaft and is attached therein by soldering or gluing. But the mounting shaft can also be designed as a slender cone and pressed into the hollow-conical drill hole of the screw. In this known drill screw it is of course possible to center the unit when mounting the drill point; but the production of the drill point is complicated since it is composed of a platelet-like part to which the cylindrical or conical-shaped mounting shaft is attached or mounted.

From U.S. Pat. No. 22 66 892 an anchoring device is known that consists of a bolt provided on one end with a thread and on the other end with a forged, arrowhead-like head. Instead of this, the shaft can also be provided with an axial slit, in which a platelet-like head unit, to be produced separately, can be attached by welding, riveting or similar means. It is not possible to center the unit described in this patent.

U.S. Pat. Nos. 37 15 952 and 37 18 067 describe an expansion anchor unit or a mounting system where a platelet-like cutting tool is installed in an axial slit at the end of a shaft and is held form-fitted therein for hole drilling. After drilling the hole and removal of the shaft, another shaft-like part is driven into the hole, expanded by the platelet-like cutter remaining in the in drill hole, and thereby attached in the hole. Now it may be possible to center the unit here, but the platelet-like cutting tool will only be held loosely in the axial slit since the shaft after drilling, is to be pulled from the drilled hole without the cutting tool.

Finally, from AT-PS 232 908 a drill for drilling through rock, hard shingles and similar mineral materials is known that has a cylindrical drill element with a diametrical groove formed on the end. The sections of the drill element extending along the groove are curved around in the opposite directions so that a rear support is created for the parts extending outside the cylindrical perimeter of the drill element of a cutting metal plate installed in the groove. The cutting metal plate is mounted in the groove by hard soldering or similar means. But it is not possible to center the cutting metal plate during its assembly.

Now all the above, known, self-drilling connecting units or drills have a difficult problem of holding the platelet-like cutting unit in the proper position to the shaft until final, secure connection, in order to ensure a proper axial alignment between the platelet-like cutting tool and the shaft.

SUMMARY OF THE INVENTION

It is an object of present invention is to provide a self-drilling connecting unit so that a sufficiently solid mount can be achieved for a platelet-like cutting tool without additional actions and moreover so that it will ensure that right in the mounting a proper axis alignment is attained between the cutting tool an the self-drilling connecting unit.

To attain this object, a self-drilling connecting unit includes a platelet-like cutting tool connectable to a shaft, where the platelet-like cutting tool has on its end region facing the shaft, at least one platelet-like protrusion lying in the plane of the cutting tool; the end region of the shaft bearing the cutting tool has a central opening of circular, elliptical or polygonal cross section and the cutting tool protrusion is insertable into the opening on the shaft with press seat for centering and force-fit mounting of the cutting tool to the shaft, and is braced in the opening against two diametrically opposing boundaries of the inside wall of the opening. The objects of the present invention are also attained by a self-drilled connecting unit including a shaft-mountable, platelet-like cutting tool, where the platelet-like cutting tool has several spaced, platelet-like protrusions lying in the plane of the cutting tool on its end region facing the shaft; the end region of shaft bearing the cutting tool has a central, axially protruding lug of circular, elliptical or polygonal cross section and for centering and force-fitted mounting of the cutting tool to the shaft, the cutting tool protrusions can be set on and braced on the lug against two diametrically opposed boundaries of the outer wall of the lug with press-fit.

By means of this invention, the cutting tool is aligned precisely with the connector unit axis, and is axially secured and set into the position to transfer the necessary torque, practically in only one work step by insertion into an opening or by pressing onto a lug. Numerous attempts have shown that in a self-drilling connecting unit of the invented type and in the invented manner, a platelet-like cutting tool can be mounted and aligned not merely exactly, but also that the necessary force-fitting to transfer the torque occurring during drilling can be achieved solely by insertion or pressing-on the platelet-like cutting tool with press-seat. A sufficient axial locking can also be ensured between the platelet-like cutting tool and the shaft of the connecting unit so that the cutting tool is held in the shaft so it cannot be lost. Now it should be recalled that the platelet-like cutting tool in a self-drilling connecting unit has to be secured sufficiently only for one drill process, since a self-drilling screw will not be unscrewed again for reuse. Thus it would be entirely possible that the platelet-like cutting tool would be stripped off during any subsequent unscrewing, but for self-drilling connecting units, it would be of no significance, since the platelet-like cutting tool need only be held sufficiently to transfer the torque in one drilling process, and in addition, the cutting tool must be held securely to the shaft before the drilling process, so it cannot be lost.

For self-drilling connecting units it should be considered that we are dealing with mass-consumed articles that are to be produced as easily as possible and in one work step by cold forming of the material, and that the allocation of the cutting tool is likewise to take place in only one work step, whereby a sufficient mount is required only to allow a single drilling process to be carried out.

Now it turns out that the self-drilling connecting unit according to the invention is much easier to produce than known self-drilling connecting units, where the platelet-like cutting tool has to be inserted into a diametrical groove, since the formation of an opening or of a lug on the free end of the shaft of the self-drilling connection unit per this invention is much simpler than the production of a corresponding groove.

Now for example, when a very large torque has to be transferred in a particular application, then it is possible to reinforce the connection through appropriate deformation of the shaft region adjoining the platelet-like cutting tool. In a self-drilling connecting unit, for a single drilling application of the platelet-like cutting tool, in general the invented press-seat mount of the cutting tool to the shaft will be sufficient, as presented above.

It is inherently known, for example from DE-OS 25 55 647 cited above, how to provide an opening on the free end of a connector shaft in which a circular cross section, lug-like section of an otherwise platelet-like cutting tool is then inserted. This is common for press-seat fittings of the state of the art, since usually emphasis is placed on the mutually insertable parts having a corresponding cross sectional shape and size. But the invention takes into account the possibility of holding securely a part of platelet-like cross section in an opening with press seating; said opening has a quite different, circular, elliptical or polygonal cross section. Precisely due to this invented measure, an optimum connection is created between a platelet-like cutting tool and a shaft of a self-drilling connecting unit and at the same time, the cutting tool will be centered upon insertion, whereby nonetheless, a simple production of the shaft (by forming) and of the cutting tool (by die cutting) is possible.

According to the present invention, it is further suggested that the thickness of the protrusion or of the protrusions corresponds at least roughly to the thickness of the region of the cutting tool directly adjoining the protrusion. Thus in this invented type of connection it is possible to design the cutting tool as a stamped metal part.

It is further suggested that the side boundaries of the protrusion converge together at least at its free end, or the side boundaries of two protrusions facing each other diverge at least at the free end of said protrusions. Thus when joining the platelet-like cutting tool and shaft together, a simple insertion of the protrusion or of the protrusions, is possible, and upon further pressing in of the press seat, that is, the compression force, is constantly increased.

In this regard it is also possible to design the opening in the shaft, or the lug on the connecting unit shaft, as a conically tapered structure, at least on a partial region of its depth or its length, respectively. Then the side boundaries of the protrusion can run parallel to each other or likewise converge or diverge slightly, where the greatest compression force for the press seat is achieved after completed joining of the parts.

To achieve an easier insertion of the protrusion or of the protrusions into the opening or onto the lug of the shaft, it is proposed that the protrusion or the protrusions, respectively, of the cutting tool be of rounded design at the transition between the side boundaries and the front boundary.

One particular possibility for additionally increasing the possible torque will be created when the opening of polygonal cross section has an even number of corner regions, where the side boundaries of the protrusion of the cutting tool mesh with press seat in two diametrically opposinig corner regions of the opening. Thus with the type of configuration it is inherently possible to achieve a force-fitted linkage and also a form-fitted linkage merely by inserting the platelet-like cutting tool; this link makes it possible to transfer a large torque from the shaft to the cutting tool during the drilling process.

In order to improve the form-fitted link and the force-fitted link even more, it is possible to provide the cutting tool with cutter-like edges on its boundary facing the protrusion in the regions extending over the side of the protrusion, or in the region lying between two protrusions. When inserting the platelet-like cutting tool, these cutter-like edges penetrate into the free end section of the shaft and thus cause an additional, form-fitted connection or link.

If an optimum form- and force-fitted connection is to be achieved without the need for additional connecting measures, like welding, soldering or gluing, then the invention proposes that radially aligned slits be provided at the free end of the mounting shaft running radially out from the opening or the lug. Now when measured in the axial direction of the shaft, from its free end, the depth of the opening is at least two to three times as large as the depth of the slit, or when measured from the base of the slit to the free end of the shaft, the length of the lug is at least two to three times as large as the depth of the slit.

Another embodiment for force-fitting and form-fitting connection between cutting tool and shaft consists in the fact that at the free end of the shaft on one side of its outer wall, or on both sides on two diametrically opposing sites, two axis-parallel grooves are provided and that the cutting tool has strip(s) extending parallel to the protrusion on one or both side boundaries, said strip meshes in groove(s) on the shaft when in the assembled state. The protrusion provided on the cutting tool causes the centering and force-fitted mount of the cutting tool to the shaft, and the strips extending out parallel to the axis, or the extended strips, respectively, act as tangs to transfer correspondingly sized torques. Due to the embodiment of the invention and due to the force-fitted mount of the cutting tool to the shaft, inherently a correspondingly exact axial alignment between cutting tool and shaft is ensured. But in addition, when a form-fitted and absolutely tight connection is to be achieved between the two parts inserted into each other, then it is possible that the central opening, or the central lug, respectively, on one or both sides of the front face of the mounting shaft, will have bulges, hubs or similar features formed by pressing on insertion; these features are provided on both sides for form-fitted and/or force-fitted mounting of the cutting tool.

Now it is also possible that the free end of the mounting shaft is deformable by pressing on or by pressing in, the region of the middle opening after insertion of the cutting tool with the protrusion. In this manner, an additional form-fitted connection can be created, in addition to the force-fitted mount.

BRIEF DESCRIPTION OF THE DRAWINGS

FIG. 1 is a front view of a self-drilling connecting unit designed as a rivet, presented in a partial cutaway view;

FIG. 2 is a side view, particularly a partial cutaway view of the rivet;

FIG. 3 is a plan view of the rivet, viewed from below;

FIG. 4 is a cross section through the end region of the shaft according, to FIG. 1;

FIG. 5 is a view of the shaft from below;

FIGS. 6 and 7 are front and side views, respectively, of the cutting tool;

FIG. 8 is a front view of the self-drilling connecting unit designed as a screw, with a joining cutting tool;

FIG. 9 is a side view, in a partial cutaway illustration, of the connection region between the cutting tool and the shaft according to FIG. 8;

FIGS. 10 and 11 are a side view and a front view of a connection between the cutting tool and the shaft, with additional deformation of the shaft;

FIGS. 12 and 13 are two partial elevation views, respectively, of a cutting tool with cutter-like boundaries directed opposite to the shaft;

FIG. 14 is a partial front view of a cutting tool with several protrusions at of the end of the shaft;

FIG. 15 is a plan view of the end of the shaft according to FIG. 14;

FIGS. 16 and 17 are plan views of the shaft, seen from below, showing polygonal openings;

FIG. 18 is a front view showing the region of the connection of a cutting tool with a shaft corresponding to the embodiment of FIG. 17;

FIG. 19 shows an embodiment of the protrusion of a cutting tool;

FIG. 20 shows a front view of the tool with the connection between the cutting tool and the shaft with a lug formed on the shaft;

FIG. 21 is a front view of the cutting tool used in the embodiment of FIG. 20;

FIG. 22 is a plan view of the connection according to FIG. 20, viewed from below.

DETAILED DESCRIPTION OF THE PREFERRED EMBODIMENTS

In the description below, a self-drilling connecting unit will be explained, with reference to self-drilling rivets and self-drilling and thread-cutting screws. A self-drilling connecting unit also means here a design of the dowel that can be used without predrilling, that is, it is self-drilling.

The drilling device of the connecting unit consists of a platelet-like cutting tool (1) that is form-fitted and/or force-fitted to a shaft (2). In the design according to FIGS. 1 to 3, the shaft (2) forms the pulling section to deform a rivet element (3). The cutting tool (1) has a protrusion (4) lying in the plane of the cutting tool, and at the end region of shaft (2) there is an opening (5) of circular cross section. The protrusion (4) of cutting tool (1) can be inserted into opening (5) at shaft (2), whereby the protrusion (4) with its two side boundaries (6) is braced by press-seating against two diametrically opposing boundaries of the inner wall (7) of opening (5).

In this embodiment, the central opening (5) does indeed a circular cross section, but it is also possible to use an elliptical or polygonal cross section of this opening (5), whereby the boundary walls can be smooth, arched or even stepped in shape.

In FIGS. 4 and 5 the end region of shaft (2) is shown in detail, and in FIGS. 6 and 7 the cutting tool (1) is shown separately. The thickness of the protrusion (4) of the cutting tool (1) corresponds at least approximately to the thickness of the region of the cutting tool (1) directly adjoining the protrusion (4). Thus in a simple manner it is possible to design the cutting tool (1) as a stamped metal part. In order to ensure an easy insertion of the protrusion (4) into opening (5), a kink (9) or a corresponding rounding is provided at the transition between the side regions (6) and the front boundary (8). At the free end of the cutting tool (1) a drill bit (10) of standard design is provided in the usual manner.

At the free end of shaft (2) radially aligned slits (11) emanate from opening (5), and in the axial direction of shaft (2), measured from its free end, the depth T1 of opening (5) is at least two to three times as large as the depth T2 of slit (11). Due to this design, both a force-fitted and also a form-fitted connection is created between the cutting tool (1) and shaft (2), so that a correspondingly large torque can also be transferred. The protrusion (4) of cutting tool (1) introduced in the press seat in opening (5) at shaft (2) causes an unloosenable mount of the cutting tool (1) to shaft (2), and due to the regions of cutting tool (1) meshing into the slit (11), an orderly rotational carry through is ensured. In this regard it is also possible to provide a slit (11) emanating from opening (5) on one side only, since this would be sufficient for the carry through, but then a correspondingly different die cut shape would be needed for the cutting tool (1).

It would also be possible to create a solid connection between cutting tool (1) and shaft (2), in addition to the already sufficient form-fitted and force-fitted connections, for example, by welding, soldering or gluing them, but in most case this will be superfluous and thus should be omitted for cost reasons.

FIGS. 8 and 9 show the drilling device of self-drilling and thread-cutting screws. Practically the same configuration and thread-cutting screws. Practically the same configuration has been selected here as for the embodiment in FIGS. 1 to 7, so that the reader can refer to the explanation, presented there.

The embodiments shown in FIGS. 10 and 11 provide that when it is necessary to transfer large torques, on the front side of shaft (2) or one or both sides of the middle opening (5), bulges (12), hubs or similar features are provided for pressing in or insertion for additional, form-fitted mounting of the cutting tool (1), instead of the slit (11) provided in the design of FIGS. 1 to 7. In this regard it is also possible to deform the free end of shaft (2) after insertion of the cutting tool (1) with protrusion (4) in the region of the central opening (5) by pressing in or by pressing on.

In the embodiment illustrated in FIGS. 12 and 13, the cutting tool (1) is provided with cutter-like edges (13) on its boundary facing the protrusion at the regions extending laterally over the protrusion. When pressing the protrusion into the opening on shaft (2), the cutter-like edge (13) will be pressed into the free end region of shaft (2), so that a correspondingly large torque can be transferred. Depending on the direction of rotation when drilling, the cutter-like edge (13) will be turned to one or the other surface of the cutting tool (1) in order to allow an orderly carry through.

In the embodiment according to FIGS. 14 and 15, grooves (15) running parallel to the axis are formed at the free end of shaft (2) at its outer wall (14) at two diametrically opposite sites. The cutting tool (1) has strips (16) aligned parallel to protrusion (4) on both side boundaries; when in the mounted state, these strips mesh into the grooves (15) on shaft (2). In this design it would also be possible to provide only one such strip (16) next to the protrusion (4), since a single such strip (16) would also be in the position to transfer the necessary torque between the shaft (2) and the cutting tool (1).

In this regard, since this is also explained with reference to the cross section shown in FIG. 14, it would also be possible to call both the strips (16) and the protrusion (4) as all protrusions, and in such a case, at the free end of shaft (2) a circular element would be formed on one side, and on the other side a lug would be formed at its outer wall. The side boundaries of the protrusion (4) in the press seat would then touch the inside walls of opening (5) and the inner boundaries of strip (16) would then be braced in the press seat against the outer wall of the ring-shaped element.

In the embodiment according to FIGS. 16 and 17 it is evident that the opening (5) in shaft (2) has a polygonal cross section. It is necessary here that the polygonal opening (5) have an even number of corner regions, or that at least two corner regions are exactly diametrically opposite each other. The side boundaries of protrusion (4) of cutting tool (1) then mesh into these diametrically opposing corner regions of opening (5) and are pushed in there with press-seat. Thus, in addition to a force-fitted connection due to the insertion with press seat, inherently also a form-fitted connection is ensured that makes possible the transfer of a corresponding torque. FIG. 18 shows one such embodiment in a front view, where the immediate vicinity of the connection region is cut open.

FIG. 19 shows one sample design of a cutting tool (1) that has rounding (17), at the transition region between the side boundaries (6) and the front boundary (8) of protrusion (4).

In the embodiment according to FIGS. 20 to 22, a corresponding lug (18) is formed onto the free end of shaft (2), in contrast to the opening (5) provided for the other designs. The cutting tool (1) then has two protrusions (4) set at a distance apart from each other, whereby the inside boundaries (6) of the protrusions (4) are pushed with press seat onto the outer wall of lug (18). With this embodiment a precisely axis-parallel alignment between cutting tool (1) and shaft (2) is possible, but where additional measures, like e.g. slits, grooves, strips etc. should be provided for this embodiment when large torques are to be transferred. Different cross-sectional forms are also possible for this type of lug (18), and in particular, a polygonal design would give an increase in the torque to be transferred. It would also be possible to have concave or even convex bulged intermediate regions between the sequential corners in order to thus increase the potential transfer of torque due to the particular selection of the point of attack of the side boundaries of the protrusions.

Both in the shape of the opening (5) and also in the configuration of the lug (18), it is possible to have conically running parts to simplify insertion and to continually increase the strength of the press seat. The side boundaries (6) of protrusion (4) or of protrusions (4) thus can converge toward each other, at least at the free end or the protrusion, or the side boundaries of two protrusions (4) facing each other can diverge from each other, at least at the free end of the protrusion. In this regard it is also possible to form opening (5) in shaft (2), or lug (18) on shaft (2), respectively, as conically tapered at least along a partial region of its depth, or of its length, respectively.

In the above description we have been talking about one opening (5) and one lug (18) throughout. But it is also possible to provide two or more than two openings or lugs on the free end region of shaft (2), and then a correspondingly large number of protrusions (4) at the cutting tool (1). This type of design is naturally only possible when shaft (2) has a correspondingly large diameter. When using more than one opening, in any case a form-fitted connection will be ensured, in addition to the force-fitted, mutual connection to transfer a large torque.

It is also possible to form opening (5) or lug (18), and accordingly also the protrusion (4) or the protrusions (4), as stepped along their depth, height or length.

The choice of materials for the cutting tool (1) and the shaft (2) depends entirely on the particular end use, so that it is now possible to select from among numerous materials for the form the shaft (2) as a plastic component, or to make it out of any other imaginable material.

If the cutting tool (1) is to be joined to shaft (2) solely by pushing on the cutting tool (1), that is, the mount generated solely by the press seat is sufficient, then this will give the simple possibility of removing the cutting tool (1) after the drilling process by an impact or pulling motion. This can be an advantage in particular when the possibility of damage to the back side of the part being drilled is to be eliminated.

I claim:

1. A self-drilling connecting unit comprising a shaft and a platelet-like cutting tool connectable to the shaft, the platelet-like cutting tool having on an end region thereof facing the shaft, at least one platelet-like protrusion lying in a plane of the cutting tool; an end region of the shaft bearing the cutting tool and having a central opening of a cross-section selected from circular, elliptical and polygonal cross section, said at least one protrusion being insertable into the central opening with a press fit for centering and force-fit mounting of the cutting tool to the shaft and being braced in the central opening against two diametrically opposing boundaries of an inside wall of the central opening.

2. Connecting unit according to claim 1, wherein said boundaries of the protrusion converge together at least at a free end thereof.

3. Connecting unit according to claim 1 wherein said opening in the shaft is conically tapered at least on a partial area of a depth thereof.

4. Connecting unit according to claim 1, wherein the protrusion is of a rounded configuration at a transition between side boundaries and a front boundary thereof.

5. Connecting unit according to claim 1, wherein the central opening has a polygonal cross section and an even number of corner regions, and side boundaries of the protrusion of the cutting tool are press-fitted in two diametrically opposing corner regions of the central opening.

6. Connecting unit according to claim 1, wherein the cutting tool has cutter-like edges on a boundary thereof facing the protrusion in the regions extending laterally over the protrusion.

7. Connecting unit according to claim 1, wherein for additional, form-fitted linkage between the cutting tool and the shaft, at a free end of the shaft, slits emanating radially from the central opening are provided, and the depth (T1) of the central opening is at least two to three times as large as the depth (T2) of each slit, measured in an axial direction of the shaft from its free end.

8. Connecting unit according to claim 1, wherein for an additional form-fitted connection between the cutting tool and the shaft (2), a groove is formed parallel to an axis of the shaft at the free end thereof at least on one side of an outer wall, the cutting tool having a strip extending parallel to the protrusion on one side boundary thereof, said strip meshing in the groove in the shaft in the assembled state.

9. Connecting unit according to claim 1, wherein on a front side of the shaft at both sides of the central opening, bulges are provided for pressing in and insertion of the cutting tool, for an additional, form-fitted mounting.

10. Connecting unit according to claim 1, wherein for an additional form-fitted connection between the tool and the shaft (2), two axis-parallel grooves are formed on the shaft at the free end of the shaft, the cutting tool having strips extending parallel to the protrusion, each strip meshing in the respective groove of the shaft in the assembled state.

11. A self-drilling connecting unit comprising a shaft, a platelet-like cutting tool, the platelet-like cutting tool having several spaced platelet-like protrusions in an end region thereof facing the shaft; an end region of the shaft bearing the cutting tool and having a central, axially protruding lug of a cross-section selected from circular, elliptical and polygonal cross section and wherein for centering and force-fitted mounting of the cutting tool to the shaft, the protrusions of the cutting tool can be set on and braced on the lug against two diametrically opposed boundaries of an outer wall of the lug with a press-fit.

12. Connecting unit according to claim 11, wherein facing side boundaries of two protrusions diverge at least at their free ends.

13. Connecting unit according to claim 11, wherein the lug on the shaft is conically tapered at least on a part of its length.

14. Connecting unit according to claim 11, wherein each protrusion of the cutting tool is of rounded configuration at a transition between side boundaries and a front boundary thereof.

15. Connecting unit according to claim 11, wherein the cutting tool has cutter-like edges in a region lying between two protrusions.

16. Connecting unit according to claim 11, wherein for an additional, form-fitted linkage between the cutting tool and the shaft, at a free end of the shaft, slits emanating radially from the lug are provided, and the depth of the lug (18) is at least two to three times as large as the depth (T2) of each slit, measured from a base of the slit to the free end of the shaft.

17. Connecting unit according to claim 11, wherein on a front side of the shaft on both sides of the central lug, bulges are provided for pressing in and insertion of the cutting tool for an additional, form-fitted mounting of the cutting tool.

* * * * *